(12) United States Patent
Medvinsky et al.

(10) Patent No.: US 8,997,252 B2
(45) Date of Patent: Mar. 31, 2015

(54) DOWNLOADABLE SECURITY BASED ON CERTIFICATE STATUS

(75) Inventors: Alexander Medvinsky, San Diego, CA (US); Tat Keung Chan, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 704 days.

(21) Appl. No.: 12/794,305

(22) Filed: Jun. 4, 2010

(65) Prior Publication Data

US 2010/0313014 A1    Dec. 9, 2010

Related U.S. Application Data

(60) Provisional application No. 61/184,018, filed on Jun. 4, 2009.

(51) Int. Cl.
| | |
|---|---|
| G06F 21/00 | (2013.01) |
| H04L 29/06 | (2006.01) |
| G06F 21/10 | (2013.01) |
| G06F 21/33 | (2013.01) |

(52) U.S. Cl.
CPC ............... *H04L 63/06* (2013.01); *G06F 21/10* (2013.01); *G06F 21/33* (2013.01); *H04L 63/0823* (2013.01); *H04L 63/20* (2013.01); *G06F 2221/2105* (2013.01); *G06F 2221/2145* (2013.01); *H04L 2463/101* (2013.01)
USPC .................................. 726/29; 726/26; 726/27

(58) Field of Classification Search
CPC ...................................................... G06F 21/33
USPC ................................................ 726/29, 26, 27
See application file for complete search history.

(56) References Cited

U.S. PATENT DOCUMENTS

| | | | | |
|---|---|---|---|---|
| 6,445,797 | B1 * | 9/2002 | McGough | 380/285 |
| 2001/0012366 | A1 * | 8/2001 | Van Rijnsoever et al. | 380/241 |
| 2001/0014970 | A1 * | 8/2001 | Kamperman et al. | 725/31 |
| 2001/0029584 | A1 * | 10/2001 | Van De Haar | 713/193 |
| 2001/0046299 | A1 * | 11/2001 | Wasilewski et al. | 380/282 |
| 2001/0051996 | A1 * | 12/2001 | Cooper et al. | 709/217 |
| 2001/0053226 | A1 * | 12/2001 | Akins et al. | 380/282 |

(Continued)

OTHER PUBLICATIONS

Kamperman et al.; Conditional access system interoperability through software downloading; Published in: Consumer Electronics, IEEE Transactions on (vol. 47, Issue:1); Date of Publication : Feb. 2001; pp. 47-54; IEEE Xplore.*

(Continued)

*Primary Examiner* — Bradley Holder
(74) *Attorney, Agent, or Firm* — Fox Rothschild LLP

(57) ABSTRACT

A conditional access system (CAS) computer in a downloadable CAS receives a downloadable management certificate (DMC) and determines, using the DMC, security information including a DMC key size and an expiration time of a DMC subordinate certificate authority (sub-CA) certificate, for the client device. The CAS computer then determines whether the DMC is valid based on the expiration time of the DMC sub-CA certificate. If the DMC is determined to be valid, the CAS server sends a cryptographic identity for the client device and a CAS client to the client device protected using the DMC. At a later time, if the DMC key size is considered to be still sufficiently secure, the validity of the DMC is extended by issuing a new DMC sub-CA certificate with the same public key as the original DMC sub-CA certificate.

18 Claims, 8 Drawing Sheets

(56) References Cited

U.S. PATENT DOCUMENTS

| | | | |
|---|---|---|---|
| 2002/0044658 A1* | 4/2002 | Wasilewski et al. | 380/239 |
| 2002/0120928 A1* | 8/2002 | Wajs | 725/25 |
| 2002/0126847 A1* | 9/2002 | Wajs et al. | 380/255 |
| 2003/0005435 A1* | 1/2003 | Nelger et al. | 725/31 |
| 2003/0086569 A1* | 5/2003 | Tagashira et al. | 380/231 |
| 2004/0125959 A1* | 7/2004 | Beuque et al. | 380/279 |
| 2005/0060759 A1* | 3/2005 | Rowe et al. | 725/143 |
| 2005/0144634 A1* | 6/2005 | Koo et al. | 725/31 |
| 2005/0220304 A1* | 10/2005 | Lenoir et al. | 380/255 |
| 2005/0257260 A1* | 11/2005 | Lenoir et al. | 726/21 |
| 2006/0020784 A1* | 1/2006 | Jonker et al. | 713/157 |
| 2006/0137015 A1* | 6/2006 | Fahrny et al. | 726/26 |
| 2006/0206712 A1* | 9/2006 | Dillaway et al. | 713/176 |
| 2007/0168662 A1* | 7/2007 | Escott et al. | 713/168 |
| 2008/0098212 A1* | 4/2008 | Helms et al. | 713/155 |
| 2008/0152150 A1* | 6/2008 | Higashi et al. | 380/282 |
| 2008/0313463 A1* | 12/2008 | Depietro et al. | 713/170 |
| 2009/0083540 A1* | 3/2009 | Kim | 713/156 |
| 2009/0138720 A1* | 5/2009 | Jeong et al. | 713/176 |
| 2009/0138957 A1* | 5/2009 | Jeong et al. | 726/12 |
| 2009/0144541 A1* | 6/2009 | Kim et al. | 713/156 |
| 2009/0144766 A1* | 6/2009 | Jung et al. | 725/31 |
| 2009/0150552 A1* | 6/2009 | Kim et al. | 709/229 |
| 2009/0150672 A1* | 6/2009 | Kwon et al. | 713/169 |
| 2009/0158395 A1* | 6/2009 | Jeong et al. | 726/3 |
| 2009/0158401 A1* | 6/2009 | Kim et al. | 726/4 |
| 2009/0319796 A1* | 12/2009 | Kim et al. | 713/176 |
| 2010/0142712 A1* | 6/2010 | Tang et al. | 380/278 |

OTHER PUBLICATIONS

Damiani et al.; A fine-grained access control system for XML documents; Published in: Journal ACM Transactions on Information and System Security (TISSEC) TISSEC Homepage archive; vol. 5 Issue 2, May 2002; pp. 169-202; ACM Digital Library.*

* cited by examiner

300

DOWNLOADABLE SECURITY BASED ON CERTIFICATE STATUS

CROSS-REFERENCE TO RELATED APPLICATIONS

This application claims priority from U.S. Provisional Patent Application Ser. No. 61/184,018, filed Jun. 4, 2009, which is incorporated by reference herein in its entirety.

BACKGROUND

Digital rights management (DRM) is a term for access control technologies that are used by a content provider, such as a hardware manufacturer, a content publisher, a content copyright holder or another content owner. A content provider uses DRM technologies to impose limitations on the use of content or the devices that use the content. DRM is used to describe any technology that inhibits the use of content which is not desired or intended by a content provider.

Conditional access is the protection of content by requiring certain criteria to be met before granting access to the content. Conditional access can utilize encryption systems using encryption keys (also referred to as keys) and/or digital certificates. In encryption systems, an encryption key is generally a piece of information that determines the functional output of an encryption algorithm.

Encryption keys can be used in symmetric key encryption systems and in asymmetric encryption key encryption systems. Symmetric encryption key encryption systems often use a single encryption key, or two very similar encryption keys, shared by the sender and receiver for both encryption and decryption. To use a symmetric encryption key encryption system, the sender and receiver generally share an encryption key by some secure means in advance.

In an asymmetric encryption key encryption system the encryption key that is used to encrypt a message is not the same as the encryption key used to decrypt the message. Each user has a pair of encryption keys: a public encryption key and a private encryption key. The private encryption key is kept secret, while the public encryption key may be widely distributed. Messages can be encrypted with the recipient's public encryption key and can only be decrypted with the corresponding private encryption key, which is securely stored in the user device and is not disclosed. The public encryption key and the private encryption key can be related mathematically, but the private encryption key is not easily derived from the public encryption key.

Encryption key size is usually measured in bits of the encryption key that is used for an encryption algorithm. Strength of an encryption key is a measure of the keys resistance to being cracked, compromised or otherwise determined by an unauthorized user. Strength may be based on key size and/or other key attributes. The security of an encryption algorithm is generally related to its encryption key size or key strength since an encryption algorithm can be cracked by using a brute force algorithm. In general, a larger encryption key provides greater security because it takes longer for a brute force algorithm to crack an encryption algorithm having a larger encryption key. However, as time goes by, the strength of an encryption key used in an encryption system can diminish. This is because the computer systems used to run brute force algorithms to crack encryption keys and algorithms continuously improve and grow in strength relative to an encryption key which remains unchanged.

One type of DRM technology is a conditional access system (CAS). The CAS is typically a downloadable system which can be associated with a device that can host a download manager, or other devices. The CAS includes a CAS client. A CAS client is a computer program for the protection of content.

The device on which a CAS client resides is called a client device. The CAS client protects content, stored on or otherwise accessible to the client device, by requiring certain criteria to be met before granting access to the content. A client device is typically a consumer media device, such as a set-top box, a smart-phone, a computer, or any other device capable of storing or displaying content.

Traditionally, a CAS client is built into the client device. In a downloadable security system, or downloadable CAS system, a download manager sub-system is included in a client device that allows a CAS identity and CAS client to be downloaded and executed on the client device. In this case, when a new client device is purchased by a user, the client device may not have a CAS client that allows it to decrypt content. The client device, however, may have a bootstrap key that is used to secure the download of a cryptographic identity unique to the client device and a CAS client. Examples of a cryptographic identity unique to the client device are a private key for the client device or a symmetric client device key. A private key may also be associated with a digital certificate that is unique to a client device. However, in some situations, the bootstrap key may become obsolete or be considered at risk, for example, due to a small key size such as described above. In these instances, the cryptographic identity unique to the client device that is delivered to the client device using the bootstrap key is also considered at risk and compromised.

Typically, the CAS cannot determine which client devices have previously downloaded their cryptographic identities using an at risk bootstrap key. As a result, those client devices that have at risk cryptographic identities continue to download encrypted content even though the cryptographic identities used to encrypt the content are considered at risk for unauthorized access.

The security provided through a CAS client can become compromised if a cryptographic key in the CAS client is subject to being overcome by a brute force algorithm. Some cryptographic keys can become obsolete as computer systems running brute force algorithms or other cracking technologies become more powerful. For this reason, typically a public key digital certificate has a limited lifetime and is meant to expire when it is no longer safe to continue using the same key of this size. In the case of a bootstrap digital certificate, there are no easy or automated methods defined to replace it after expiration. When a bootstrap digital certificate is about to expire, it may be determined that the key size is still safe and the lifetime of this digital certificate could be extended. But there is still no convenient way to make such an update to thousands or millions of bootstrap digital certificates located in consumer devices.

BRIEF SUMMARY OF THE INVENTION

According to an embodiment, a downloadable conditional access system (DCAS) computer in a downloadable CAS includes a data storage device configured to store, for each of a plurality of client devices, a cryptographic identity and security information for determining whether a download manager certificate (DMC) for the client device is secure. A processor is configured to determine, using the DMC, security information including a DMC key size and an expiration time of a DMC subordinate certificate authority (sub-CA) certificate, for a client device of the plurality of client devices, and determine whether the DMC is valid based on the expiration time of the DMC sub-CA certificate. If the DMC is determined to be invalid, the cryptographic identity for the client device and a CAS client to the client device is not provided for the client device, and if the DMC is determined to be valid, the cryptographic identity for the client device and a CAS client is sent to the client device protected using the DMC. At a later time, if the DMC key size is considered to be still sufficiently secure, a validity of each DMC is extended by issuing a new DMC sub-CA certificate having extended lifetime with the same public key as the DMC sub-CA certificate.

According to another embodiment, a client device is used with the DCAS computer. The client device includes a data storage device configured to store a DMC unique to the client device, and a processor configured to send the DMC of the client device to the DCAS computer.

According to another embodiment, a method for operating a DCAS computer includes receiving a DMC of a client device, and determining, using the DMC, security information including a DMC key size and an expiration time of a DMC sub-CA certificate for the client device. The method further includes determining whether the DMC is valid based on the expiration time of the DMC sub-CA certificate. If the DMC is determined to be invalid, the method includes not providing a cryptographic identity for the client device and a CAS client to the client device, and if the DMC is determined to be valid, sending the cryptographic identity for the client device and a CAS client to the client device protected using the DM. At a later time, if the DMC key size is considered to be still sufficiently secure, the validity of each DMC is extended by issuing a new DMC sub-CA certificate having extended lifetime with the same public key as the DMC sub-CA. The method may be embodied in a computer program stored on a computer readable medium.

The embodiments described above provide the advantage of tracking DMCs for determining whether the DMCs are secure. If it determined that a DMC is considered at risk or comprised, content providers can be notified and the client device can be de-authorized. Another advantage is that DMC can have its lifetime as a secure DMC be extended either on an individual basis or a global basis, by updating the client device through issuing a new DMC sub-CA certificate for the certificate chain of a DMC for a client device.

BRIEF DESCRIPTION OF DRAWINGS

Embodiments will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. System

Figure 1A:
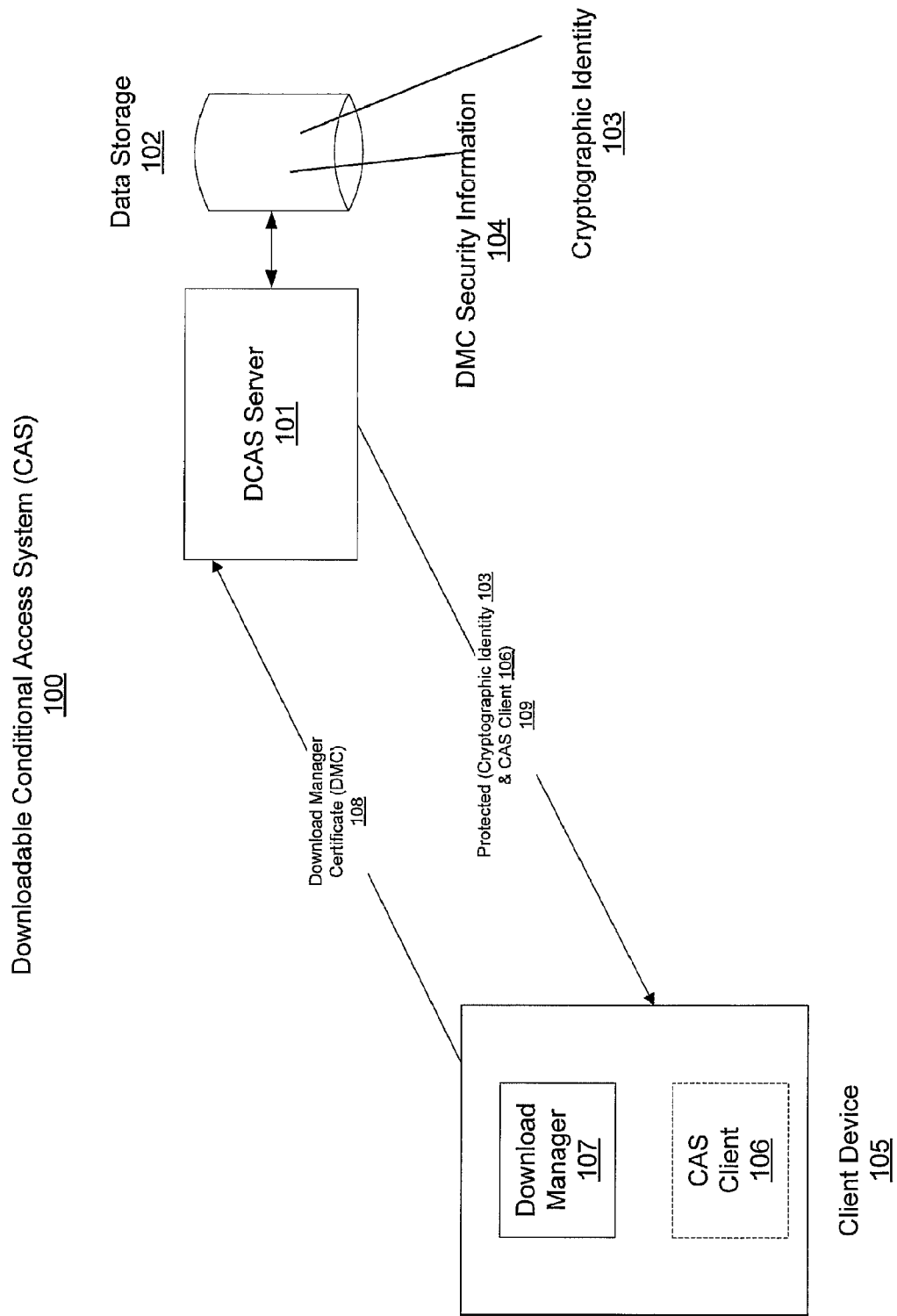
FIG. 1A illustrates a downloadable CAS system, according to an embodiment.

FIG. 1A shows a downloadable CAS system 100, according to an embodiment. The downloadable CAS system 100 includes downloadable CAS (DCAS) server 101 and client device 105. FIG. 1A shows a single client device connected to a DCAS server by way of example. It will be apparent to one of ordinary skill in the art that the DCAS server 101 may service multiple client devices, and furthermore, multiple DCAS servers may be used for the downloadable CAS system 100.

The DCAS server 101 is not limited to a server and may include any computer system configured to perform the functions described herein. The DCAS server 101 includes software and hardware, such as a processor and memory. The client device 105 may include any device capable of storing or playing content, and includes hardware and software. The client device 105 may be a consumer media device, such as a set-top box, a smart-phone, a laptop, MP3 player, or other similar user devices.

A data storage 102 is connected to or provided in the DCAS server 101. The data storage 102 stores cryptographic identities and download management certificate (DMC) security information for client devices using the downloadable CAS 100. The cryptographic identities may be unique to an associated client device. Each cryptographic identity may include a cryptographic key that can be used to decrypt content keys or other data/key materials used by the CAS, such as a private key or a symmetric secret key.

A DMC is cryptographic information that may be used to provide secure communication. A DMC generally will have certificates associated with it. These certificates can be associated in a certificate chain having a hierarchy. The certificate chain associated with a DMC may include a hierarchy of related certificates issued by certificate authorities, such as a root certificate, and a sub-CA certificate as will be explained further below with respect to FIG. 3. A unique DMC may be provided for each client device. The DMC may be provided in a client device by the manufacturer or otherwise provided to the client device. A client device may be provisioned with more than one DMC. For example, a first DMC (not shown) may be used for authenticating the download manager to other entities; while a second DMC 108 may be used for encrypting data by other entities to the download manager. In another example, the DMC 108 is a digital certificate associated with a cryptographic key, such as a bootstrap public key, used to encrypt information to be sent between the DCAS server 101 and the client device 105. The DMC 108 may also be used to securely send information between a secure storage area in the client device 105, which may be storing the cryptographic identity of the client device 105, and a standard storage area in the client device 105. This is further described with respect to FIG. 6.

The DMC security information in the data storage 102 is DMC security information for each of the client devices that may be connected to the DCAS server 101. A download manager in a CAS client may have two certificates based on generally accepted cryptographic practices of having separate keys for different purposes. Typically, a download manager may have one DMC and key for authentication purpose; while another DMC and key for encryption purpose. The DMC security information includes information used to determine whether a DMC is secure and valid. Note that if the DMC is determined to be valid it is considered secure. The DMC security information may include restrictions on the DMC size (which may include a key size), such as number of bits and related certificates such as a root certificate. The DMC itself, a Sub-CA certificate and attributes such as certificate lifetime inside the DMC and Sub-CA certificate are preferably sent by the download manager 107 as part of a request message and, typically, do not appear in Data Storage 102. Alternatively, the Sub-CA certificates are part of DMC security information 104 and are pre-stored on the CAS server. There may also be some one-way client devices that are not capable of generating request messages and in those cases the DMC may also be part of DMC security information 104 that is pre-stored on the CAS server.

The data storage 102 may store other information for each client device. For example, the data storage may store a unique ID of each client device, which may be, for example, a manufacturer serial number. The data storage 102 may also store information indicating whether a DMC is considered secure and whether a client device has a valid DMC and cryptographic identification. Determining whether a DMC is secure and valid in a client device is described below. The data storage 102 may also store CAS clients.

The client device 105 includes a download manager 107. The download manager 107 may include software and hardware stored on the client device 105 and configured to download CAS client 106. For example, the download manager 107 is used to download the CAS client 106 to the client device 105, such that the client device 105 may use content protected by the downloadable CAS 100. The CAS client 106 includes software that may receive and decrypt content. The CAS client 106 may invoke other hardware and software (not shown) which are outside of the CAS client (e.g., a content descrambling algorithm implemented in hardware for improved performance).

The download manager 107 sends a request for a CAS client to the DCAS server 101. The request includes DMC 108, which is the DMC for the client device 105. The DCAS server 101 receives the DMC 108 and retrieves DMC security information 104 for the DMC 108 from the data storage 102, which may include a database or other storage system. The DCAS server 101 analyzes the DMC security information 104 for criteria that will be explained in more detail below to determine whether the DMC 108 is secure.

If the DMC 108 is determined to be secure, the DCAS server 101 retrieves cryptographic identity 103 for the client device 105 from the data storage 102 and CAS client 106. The DCAS server 101 securely sends the cryptographic identity 103 and the CAS client 106 to the client device 105. For example, the cryptographic identity 103 and the CAS client 106 are protected with the DMC 108 (shown as 109) and sent to the client device 105. This may include encrypting the cryptographic identity 103 and the CAS client 106 with the DMC 108. The client device 105 installs the CAS client 106 and stores the cryptographic identity 103 in secure storage. The CAS client 106 is shown as a dashed box to indicate that it may be later installed as just described. If the DCAS server 101 determines the DMC 108 is not secure, the DCAS server 101 does not send the cryptographic identity 103 and the CAS client 106 to the client device using the DMC 108.

According to another embodiment, a client device 105 may request a CAS client 106 from the DCAS server 101. The DCAS server 101 determines whether the DMC 108 is valid and if a sub-CA certificate (not shown and explained below with respect to FIG. 3) associated with the DMC 108 is not yet expired but the public key size of the DMC may soon not be adequate according to predetermined criteria, then the DCAS server 101 sends the cryptographic identity 103 and CAS client 106 to the requesting client device 105 and also stores the CAS identity of the client device 105 on a list considered to be "at risk" and for further consideration of the bootstrap key size. Alternatively, the DCAS server 101 saves the DMC 108 or just the bootstrap key size in its data storage 102 so that it can be determined later if the device is at risk or is no longer secure. If it is determined at another time that the bootstrap key size for client devices on the list is no longer secure to use, these client devices can be denied access. The access would be denied because an unauthorized third party, for instance, could have monitored the initial download of the cryptographic identity, saved it and then later decrypted it when it became possible to break the bootstrap keys due to their smaller key size and due to technological advances.

According to another embodiment, a client device 105 may request a CAS client 106 from the DCAS server 101. The DCAS server 101 determines whether the DMC 108 is valid and if a sub-CA certificate (not shown and explained below with respect to FIG. 3) associated with the DMC 108 is not yet expired but the public key size of the DMC may soon not be adequate according to predetermined criteria, then the DCAS server 101 sends the cryptographic identity 103 and CAS client 106 to the requesting client device 105 and also stores the CAS identity 114 of the client device 105 on a list considered to be "at risk" and for further consideration of the bootstrap key size. Alternatively, the DCAS server 101 stores the CAS Identity, 114, the DMC 108 or just the bootstrap key size in its data storage 102 so that it can be determined later if the device is at risk or is no longer secure. If it is determined at another time that the bootstrap key size for client devices on the list is no longer secure to use, these client devices can be denied access. The access would be denied because an unauthorized third party, for instance, could have monitored the initial download of the cryptographic identity, saved it and then later decrypted it when it became possible to break the bootstrap keys due to their smaller key size and due to technological advances.

Figure 1B:
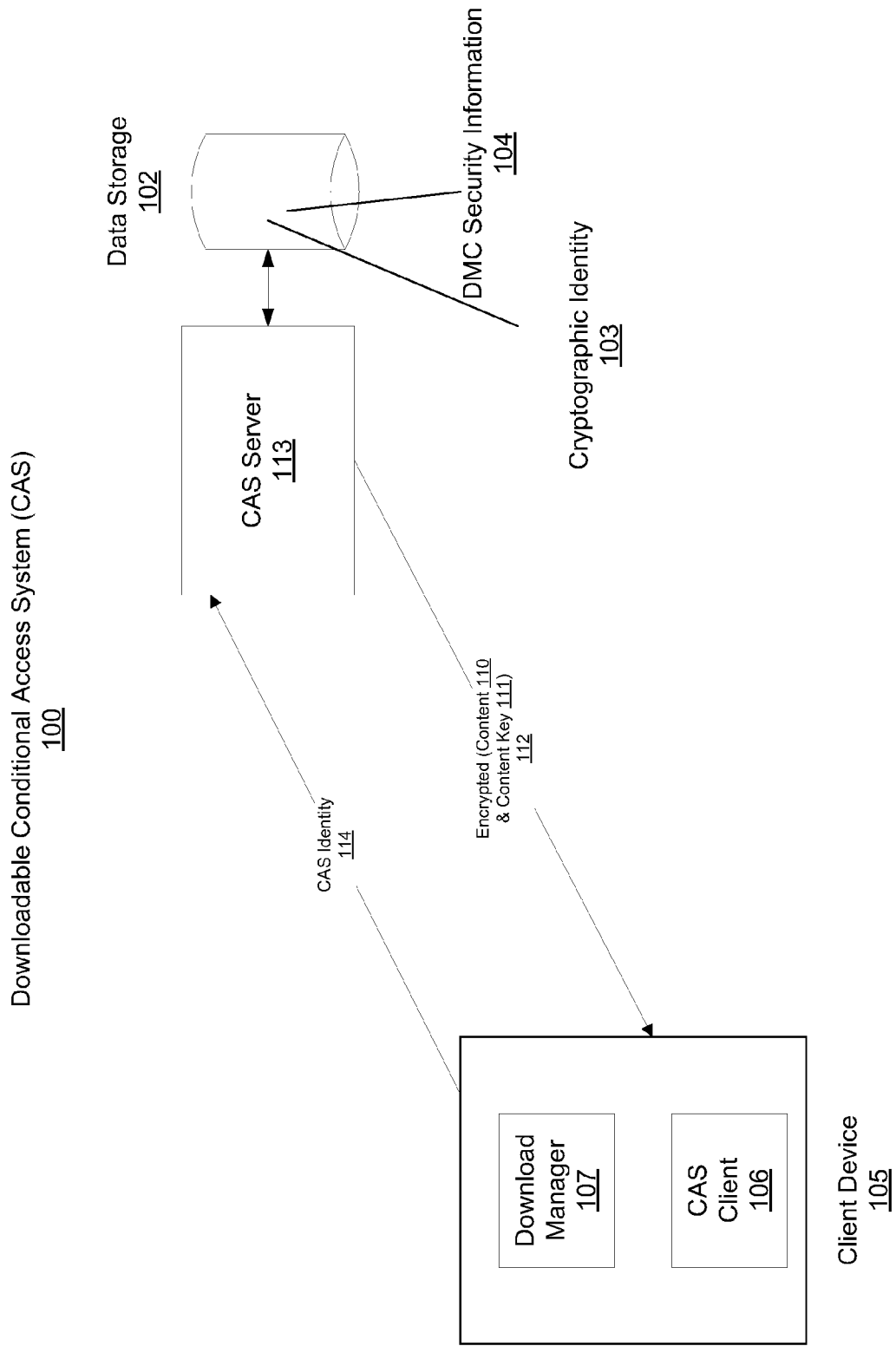
FIG. 1B illustrates another downloadable CAS system, according to an embodiment.

FIG. 1B shows a downloadable CAS (DCAS) 100, according to an embodiment. In this embodiment, the CAS client 106 has already been downloaded and installed on the client device 105 through the DCAS 100. The CAS client 106 receives encrypted content 110 and content key 111, either separately or as an encrypted package 112, from a CAS server 113. The content 110 is accessible through the client device 105, using the content key 111 and a CAS identity 114 for the CAS client 106.

According to another embodiment, the CAS server 113 can share the stored CAS identity 114 with DCAS server 101 through a database (not shown) which can be shared between CAS server 113 and DCAS server 101. The CAS server 113 may index the DMC 108 using the CAS identity 114 to determine whether the DMC 108 is on the "at-risk" list, and as a result, may deauthorize content access based on the determination.

The cryptographic identity 103 may have been previously sent to the client device 105 using the DMC 108 when the DMC 108 was considered secure but was flagged with an "at risk" status due to the public key size. Alternatively, the DMC public key size was saved into data storage 102 and it is now determined that this key size is in the "at risk" category. However, if such "at risk" DMC's are now considered insecure because public key size is outside the predetermined range or smaller than the predetermined size, the DCAS server 113 can take appropriate action for "at risk" client devices based on information in the data storage 102. The CAS server 113 may notify the content provider or service provider that the DMC 108 is no longer considered secure. The content provider or service provider may cease to provide content to the client device 105 or provide limited content or service to the client device 105, for example, until a new cryptographic identity is securely provided to the client device 105 using alternative means such as a plug-in hardware module with a new cryptographic identity that is mailed to the user.

Figure 2:
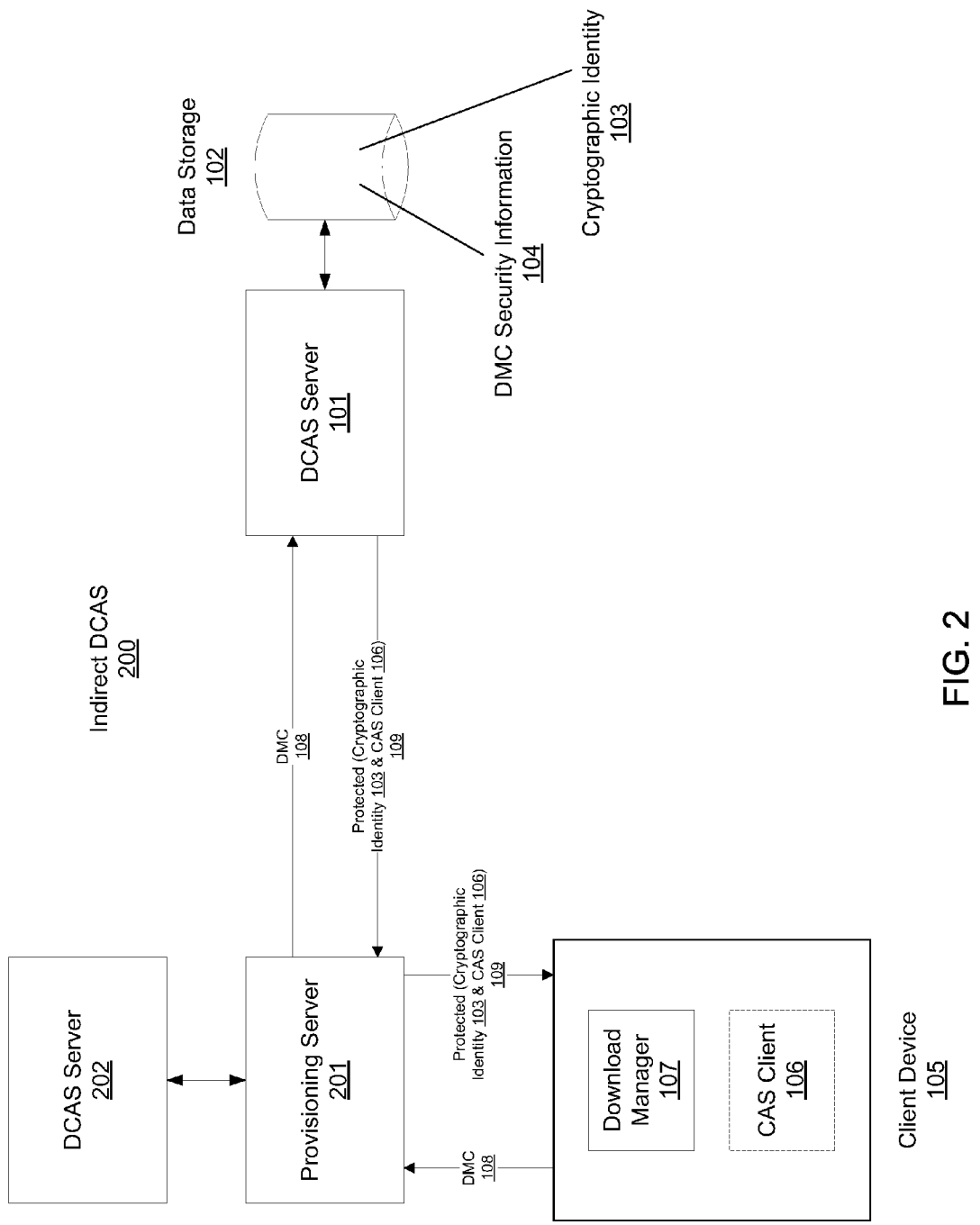
FIG. 2 illustrates another downloadable CAS system, according to an embodiment.

FIG. 2 is an indirect DCAS 200, according to an embodiment. The system shown in FIG. 1A is the same as the system shown in FIG. 2, except a provisioning server 201 serves to relay the DMC 108 from the client device 105, to the DCAS server 101. The provisioning server 201 may be connected to multiple different DCAS servers 202 for different CASs, and the provisioning server 102 may receive requests for CAS clients for multiple different CASs. The provisioning server 102 identifies the proper DCAS server to send the request, which in this example is the DCAS server 101, and then forwards the request and the DMC (e.g., DMC 108), to the DCAS server 101. The provisioning server 201 also determines which client device is to receive the information from the DCAS server, which in this example is the client device 105, and sends the information 109 (e.g., CAS client 106 and cryptographic identity 103) to the client device.

Figure 3:
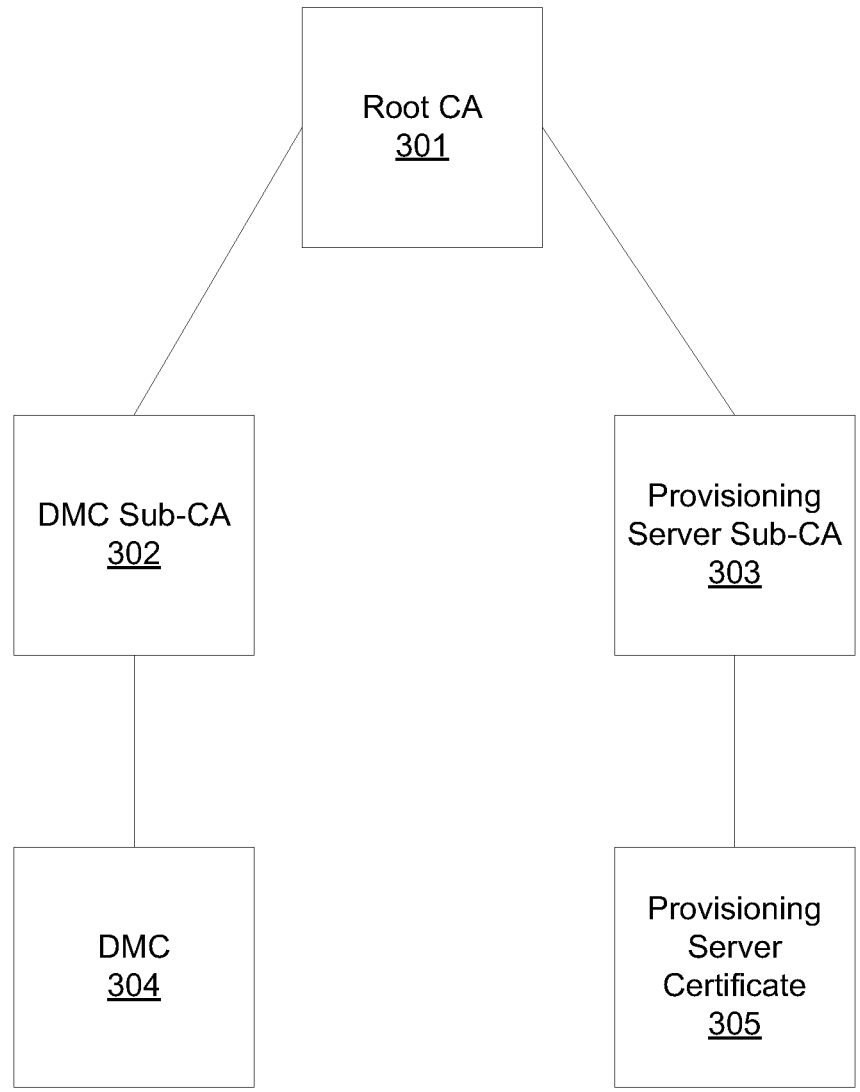
FIG. 3 illustrates a certificate hierarchy, according to an embodiment.

FIG. 3 illustrates a hierarchy of certificates 300 in a DMC, according to an embodiment. A DMC can be associated with related certificates, issued by different certificate authorities. When a CAS server sends the DMC, the related certificates can also be included. A certificate authority or certification authority (CA) is an entity that issues digital certificates for use by other parties. A CA issues digital certificates that contain a public key and the identity of the owner. The matching private key is not similarly made available publicly, but kept secret by the client device for the public key and private key pair. The certificate is also a confirmation or validation by the CA that the public key contained in the certificate belongs to the person, organization, server or other entity noted in the certificate. A CA's role in such schemes is to verify an applicant's credentials, so that users and relying parties can trust the information in the CA's certificates. A certificate authority can issue multiple certificates in the form of a tree structure. A root certificate is the top-most certificate of the tree, and is used to "sign" other certificates. Certificates below the root certificate inherit the trustworthiness of the root certificate. Certificates further down the tree also depend on the trustworthiness of the intermediates. These are known as subordinate certification authorities or sub-CAs. Sub-CA certificates may be issued by the same authority as the root certificate or, or can be issued by other certificate authorities that are subordinate certification authorities.

In FIG. 3, a root CA certificate 301 is the base-line source of trust for all the other certificates in the hierarchy 300. DMC 304 obtains its trust through DMC Sub-CA certificate 302, which in turn obtains trust from the root CA certificate 301. Provisioning server certificate 305, likewise, obtains its trust through provisioning server Sub-CA certificate 303, which in turn also obtains trust from the root CA certificate 301. Note that there is likely to be more than one Sub-CA issuing Sub-CA certificates, but typically each DMC is issued from one Sub-CA only. Although not shown, longer certificate chains may also be used.

According to the embodiment shown in FIG. 3, the DMC Sub-CA certificate 302 can have a shorter lifetime than DMC 304. As noted above, the CAS server 101 allows the download of a cryptographic identity and CAS client to a download manager based on the validity of the DMC. Since it may be unknown whether a certain key size (e.g. 2048 bit RSA) will still be considered secure in the future (e.g., 20 years), one way is to have DMC's issued with a longer lifetime (e.g., 30 years), but the sub-CA life time is limited to a lesser period, for example 20 years.

When the expiration term gets near expiration for the sub-CA certificates, for example after only 15 years for a 20 year expiration term, the security of the key can be reconsidered to determine whether the current DMC key size is still considered secure. If it is determined that, for instance, a 2048-bit RSA key will be no longer secure after expiration, then no changes need to be made to the DMC 304 installed on a client device. When the sub-CA certificate 302 expires after 20 years, all the download managers relying on such DMC 304 will be automatically disabled in the sense that the client devices with such DMC 304 won't be able to download a new CAS client and cryptographic identity, although the DMC 304 itself has not expired. This is because the DCAS Server checks validity of the full device certificate chain including the sub-CA certificate 302 which has expired. However, if it is determined that the current DMC key size is still secure, new sub-CA certificate 302 will be issued with the same public key as the original sub-CA certificate to extend the lifetime beyond the original 20 years. A new sub-CA certificate 302 may be downloaded, by various pathways, to an individual client device holding DMC 304, or all such devices that have a DMC 304 issued from that sub-CA. The download manager can then continue to function, downloading a new cryptographic identity and CAS client to the client device.

In other embodiments, the DMC sub-CA certificate 302 can be sent directly or indirectly to each individual client device directly from a certificate authority. According to another embodiment, increasing the lifetime of the client device loaded with the DMC 304 can include broadcasting or multicasting an updated sub-CA certificate to a plurality of client devices. The DCAS server 101 may later determine whether the sub-CA certificate 302 has expired. In some instances, a sub-CA certificate 302 can also be pre-configured into DCAS server's DMC security information 104.

An example, according to one embodiment, includes a certificate chain for downloadable security in a client device 105, which may only support a 2048-bit key size by introducing a sub-CA certificate having a short lifetime which can be extended if is deemed to be secure. The cryptographic identity 103 of the client device 105 downloaded using the 2048-bit key size is tracked. If it is determined later that 2048-bit key is still safe, those sub-CA certificate lifetimes can be extended. The DCAS Server 101 that provides cryptographic identities 103 to client devices 105 would keep track which cryptographic identities 103 were encrypted with the shorter 2048-bit keys. If later, the 2048-bit key size is determined to be insecure, all those cryptographic identities 103 can be de-authorized as desired.

2. Methods

Figure 4:
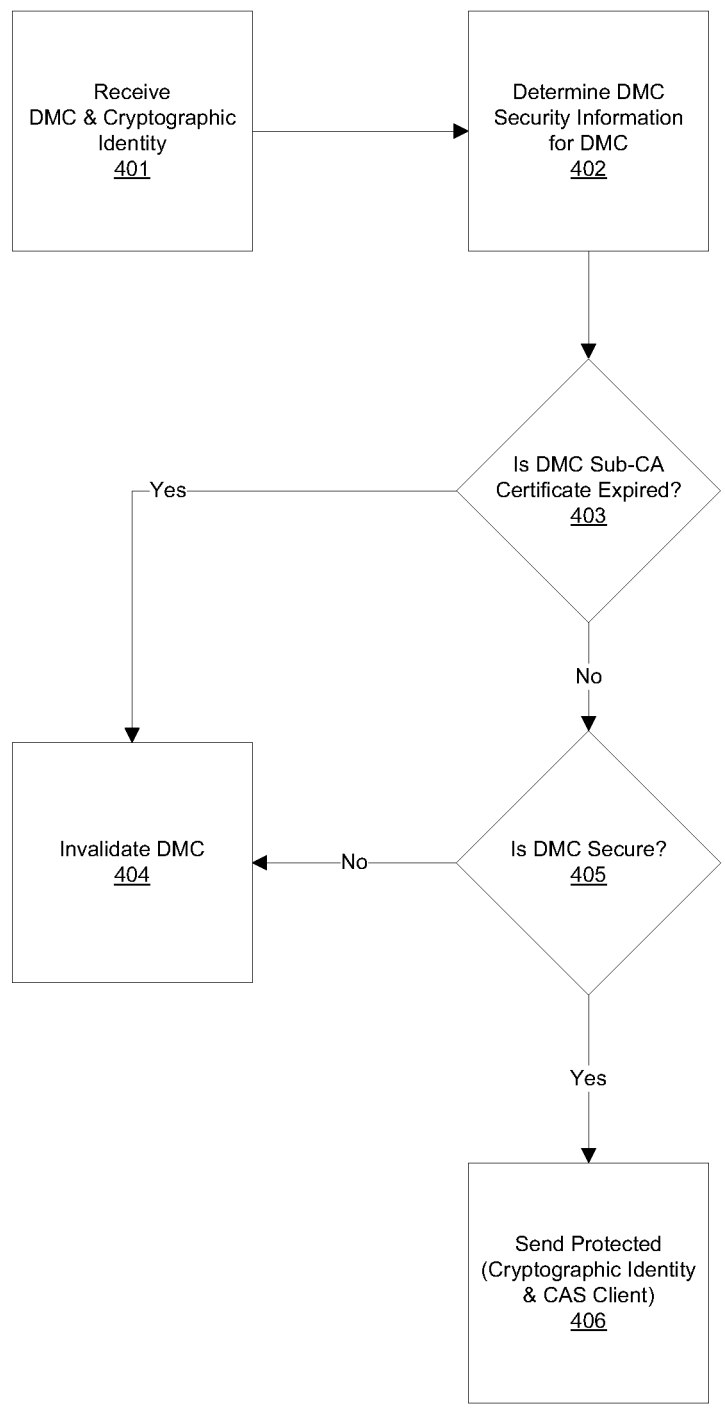
FIG. 4 illustrates a process flowchart demonstrating a method, according to an embodiment.

FIG. 4 illustrates a method 400 for sending a CAS client, according to an embodiment. The method 400 is described with respect to the systems shown in FIGS. 1A, 1B, and 2A, by way of example and not limitation, and the method may be performed in other systems.

At step 401, the CAS server 101 receives the DMC 108.

At step 402, the DCAS server 101 determines the DMC security information 104 associated with the DMC 108 and the client device 105. In the embodiment when the DMC 108 is not received directly from the client device 105, a user may provide a client device ID which is then used by the DCAS server 101 as an index to retrieve the DMC, or some other information may be used as an index to retrieve the DMC that is associated with the client device 105 from the data storage 102. The DMC security information 104 which is not received directly from the client device 105 includes a Root CA certificate, restrictions on the bootstrap key size and may also include a sub-CA certificate.

At step 403, the DCAS server 101 determines if the DMC Sub-CA is expired. The contents of the DMC Sub-CA certificate may include a lifetime parameter. If the lifetime is exceeded, the DMC is made invalid at step 404 and the client device is denied the download of a Cryptographic Identity and CAS Client.

If the DMC Sub-CA is determined not to be expired, at step 403, the DCAS server 101 determines if the DMC is secure at step 405. The DCAS Server 101 verifies the full certificate chain associated with DMC 108 and uses the security information 104 for the DMC 108 and the client device 105 to determine whether the DMC 108 is secure. In one example, the security information 104 includes an acceptable range for a DMC key size, such as the number of bits and this information is used to determine whether the DMC 108 is secure. For example, RSA keys are asymmetric and may be used in a DMC.

At step 406, the DCAS server 101 sends the protected Cryptographic Identity 103 and CAS client 106 to the client device 105.

Figure 5:
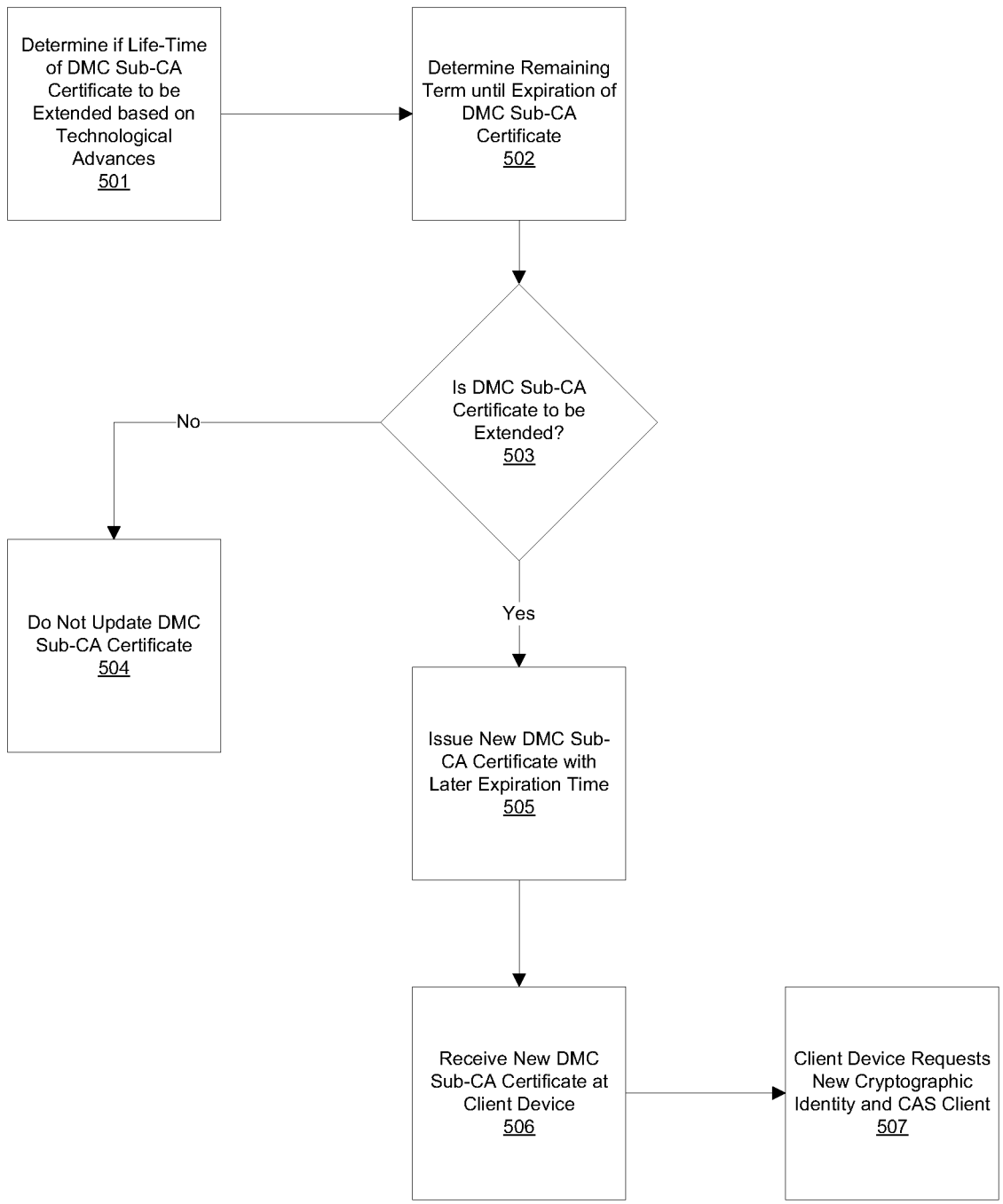
FIG. 5 illustrates another process flowchart demonstrating a method, according to an embodiment.

FIG. 5 illustrates a method 500 for extending the lifetime of a DMC, according to an embodiment. The method 500 is described with respect to the systems shown in FIGS. 1A, 1B, and 2A by way of example and not limitation, and the method may be performed in other systems. The method 500, described in greater detail below, can be practiced, according to one embodiment, as a complete method in itself. According to another embodiment, the steps in method 500 can be combined with one or more of the steps in method 400, discussed above.

A policy decision may be made based on technological advances as to whether a DMC lifetime is to be extended and if a sub-CA certificate is determined to be updated. For example, if the DMC sub-CA certificate is getting close to the end of its predetermined expiration, it may be extended. At step 501, a Certificate Authority or a Certificate Policy Authority determines that the DMC Sub-CA certificate is sufficiently close to its expiration time and a review of current technology is needed to determine if the lifetime of the Sub-CA certificate can be extended. The Certificate Authority or a Certificate Policy Authority may be an entity or board of reviewers or may be a computer system programmed to make the determination.

At step 502, at the Certificate Authority or the Certificate Policy Authority determines the remaining term until the expiration of the DMC sub-CA certificate. Next, the decision is made at step 503 as to whether the DMC lifetime should be extended. At step 505, if according to the decision in step 503, the DMC lifetime is to be extended, a new DMC sub-CA certificate with the same public key as the original sub-CA certificate is issued in step 505. The new DMC sub-CA certificate can be delivered by various pathways including directly from a certificate authority (not shown) or from an intermediate server. In the alternative, if at step 503 it is determined that the DMC sub-CA certificate is not to be extended, then in step 504, the DMC sub-CA certificate is not updated.

At step 506, the new DMC sub-CA certificate issued in step 504 is received at the client device. Subsequently, in step 507, the client device 105 with the new sub-CA certificate installed, requests a new cryptographic identity from the CAS server 113.

3. Computer Systems (CAS Server and Client device)

One or more of the steps and functions described herein and one or more of the components of the systems described herein may be implemented as computer code stored on a computer readable storage device, such as memory or another type of storage device. The computer code is executed on a computer system (e.g., the computer system 600 described below), for example, by a processor, application-specific integrated circuit (ASIC), or other type of circuit. The code may exist as software program(s) comprised of program instructions in source code, object code, executable code or other formats.

Figure 6:
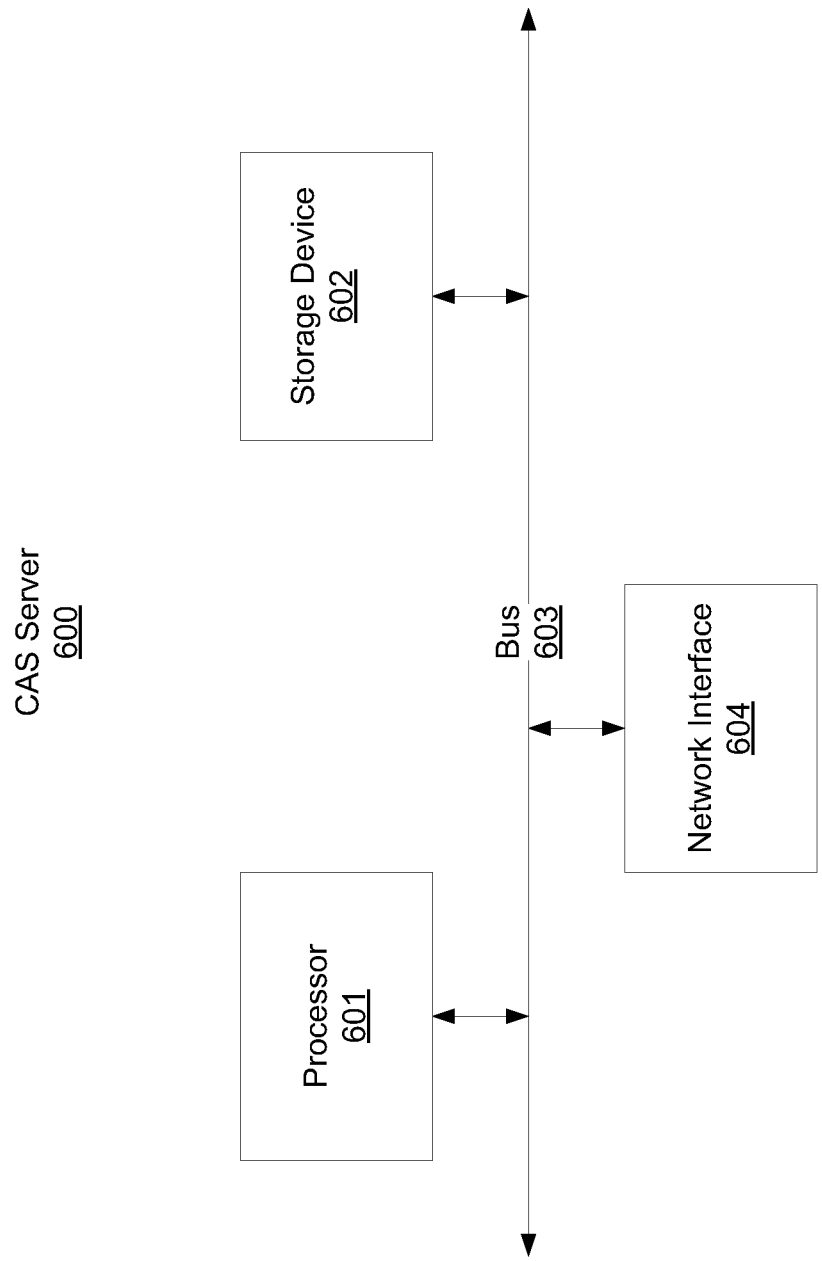
FIG. 6 illustrates a computer system configured to provide a hardware platform for the downloadable CAS (DCAS) server 101 shown in FIG. 1, according to an embodiment.

FIG. 6 shows a computer system 600 that may be used as a hardware platform for the CAS server 101. The computer system 600 may be used as a platform for executing one or more of the steps, methods, and functions described herein that may be embodied as software or computer readable medium stored on one or more computer readable storage devices, which are hardware storage devices.

The computer system 600 includes a processor 601 or processing circuitry that may implement or execute software instructions performing some or all of the methods, functions and other steps described herein. Commands and data from the processor 601 are communicated over a communication bus 603. The computer system 600 also includes a computer readable storage device 602, such as random access memory (RAM), where the software and data for processor 601 may reside during runtime. The storage device 602 may also include non-volatile data storage. The computer system 600 may include a network interface 604 for connecting to a network. It is apparent to one of ordinary skill in the art that other known electronic components may be added or substituted in the computer system 600.

Figure 7:
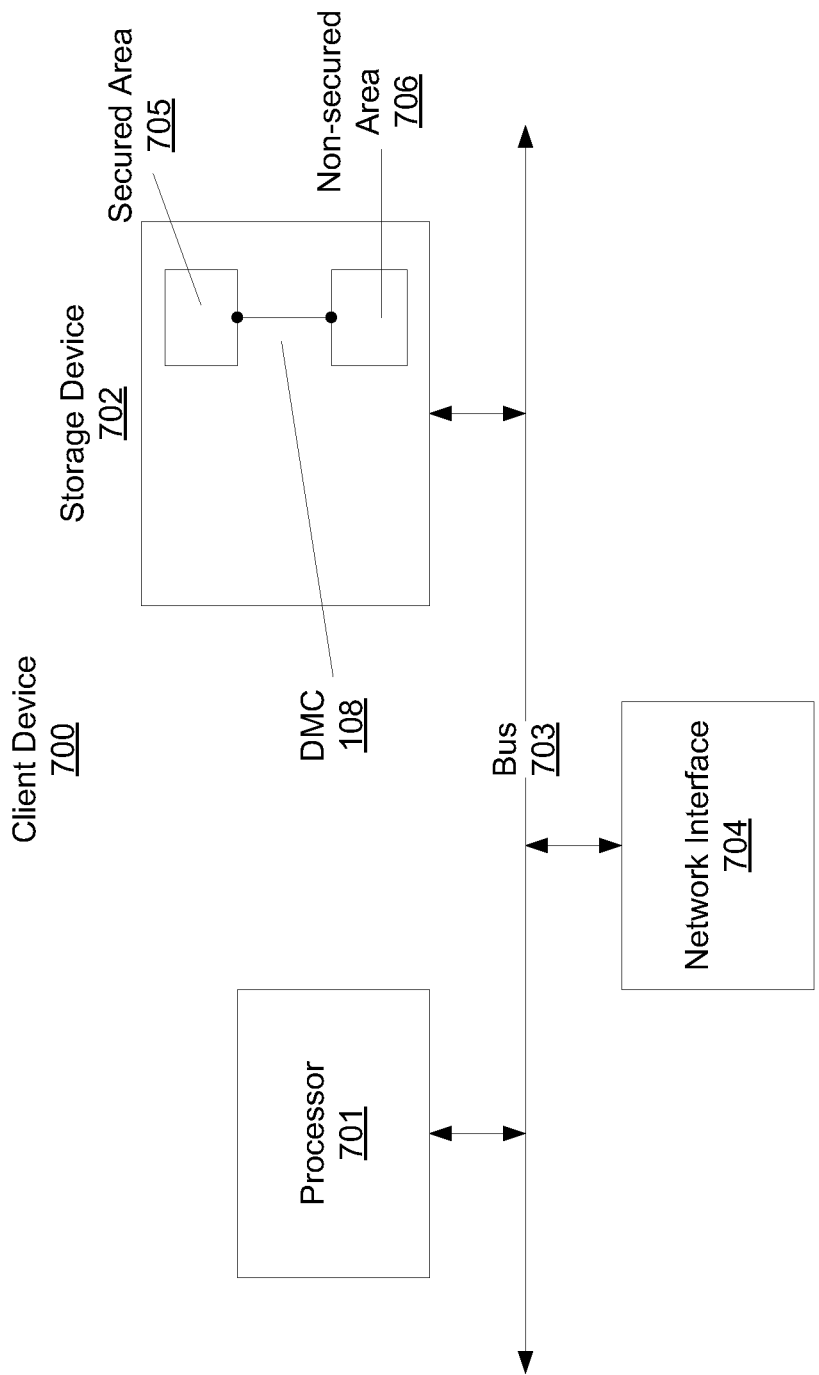
FIG. 7 illustrates a computer system configured to provide a hardware platform for the client device 105 shown in FIG. 1, according to an embodiment.

FIG. 7 shows a computer system 700 that may be used as a hardware platform for the client device 105. The computer system 700 may be used as a platform for executing one or more of the steps, methods, and functions described herein that may be embodied as software or computer readable medium stored on one or more computer readable storage devices, which are hardware storage devices.

The computer system 700 includes a processor 701 or processing circuitry that may implement or execute software instructions performing some or all of the methods, functions and other steps described herein. Commands and data from the processor 701 are communicated over a communication bus 703. The computer system 700 also includes a computer readable storage device 702, such as random access memory (RAM), where the software and data for processor 701 may reside during runtime. The computer system 700 may include a network interface 704 for connecting to a network. It is apparent to one of ordinary skill in the art that other known electronic components may be added or substituted in the computer system 700.

The storage device 702 may include a non-secured area 706 for low security data and a secured area 705. The secured area 705 includes protections to prevent the area from being accessed by an unauthorized user or program. The secured area 705 may store the cryptographic identity 103 of the client device 105. One function of the DMC 108 is to enable secure communication of data between the non-secured area 706 and the secured area 705 by encrypting the data with the DMC 108, or establishing a secure tunnel between the two using the DMC 108 and another certificate associated with the non-secured area 706 using a key exchange method authenticated with the two certificates (e.g., using a protocol such as SSL, IKE or equivalent). It is apparent to one of ordinary skill in the art that other known electronic components may be added or substituted in the computer system 700.

The systems and method described herein allow the CAS server to track whether a DMC is secure or insecure. Furthermore, if the DMC is found secure, actions are taken to minimize risk of unauthorized access to encrypted content by de-authorizing the DMC and associated cryptographic identities. Also, the DMC can have its use as a secure DMC extended through the action of the Certificate Authority in updating the DMC Sub-CA certificate which is then distributed to client devices either on an individual basis or a global basis.

While the embodiments have been described with reference to examples, those skilled in the art are able to make various modifications to the described embodiments without departing from the scope of the embodiments as described in the following claims, and their equivalents.

What is claimed is:

1. A conditional access system (CAS) computer in a downloadable CAS, the CAS computer comprising:
    a data storage configured to store, for each of a plurality of client devices, a cryptographic identity and security information for determining whether a download manager certificate (DMC) for the client device is secure; and
    a hardware processor configured to:
    determine, using the DMC, security information including a DMC key size and an expiration time of a DMC subordinate certificate authority (sub-CA) certificate, for a client device of the plurality of client devices, from the data storage device, wherein the DMC key size is a key size of a DMC public key saved in the data storage;
    determine whether the DMC is valid based on the expiration time of the DMC sub-CA certificate and on the DMC key size;
    if the DMC is determined to be invalid, not provide the cryptographic identity for the client device to the client device;
    if the DMC is determined to be valid, send the cryptographic identity for the client device to the client device protected using the DMC and at a later time, if the DMC key size is considered to be still sufficiently secure, a validity of each DMC is extended by issuing a new DMC sub-CA certificate having extended lifetime with a same public key as the DMC sub-CA certificate; and
    determine at a later time whether the cryptographic identity of the client device is configured to be used based on the DMC public key size.

2. The system according to claim 1, wherein the processor is further configured to cause a certificate authority to send the new DMC sub-CA certificate.

3. The system according to claim 1, wherein the processor is also configured to cause the new DMC sub-CA certificate to be broadcasted or multicasted to the plurality of client devices.

4. The system according to claim 1, wherein an intermediate server sends the new DMC sub-CA certificate to the plurality of client devices.

5. The system according to claim 1, wherein the processor is configured to receive the DMC from the client device.

6. The system according to claim 1, wherein the processor is configured to receive a device identifier from the client device and use it to find the DMC for the client device in the data storage.

7. The system according to claim 1, wherein the DMC public key size saved in the data storage includes a preconfigured suspected range that invokes a future review of validity of the DMC.

8. The system according to claim 1, wherein the processor is also configured to, if the DMC public key size is determined not to be usable for the later determination, store an indication in the data storage that the cryptographic identity is not usable for the later determination.

9. A client device configured to receive a conditional access system (CAS) client for a CAS, the client device comprising:
    a data storage configured to store a download manager certificate (DMC) unique to the client device; and
    a hardware processor configured to send the DMC of the client device to a CAS computer;
    wherein the CAS computer is configured to:
    receive a DMC of the client device;
    determine, using the DMC, security information including a DMC key size and an expiration time of a DMC subordinate certificate authority (sub-CA) certificate, for the client device, from the data storage, wherein the DMC key size is a key size of a DMC public key saved in the data storage;
    determine whether the DMC is valid based on the expiration time of the DMC sub-CA certificate and on the DMC key size;
    if the DMC is determined to be invalid, not provide a cryptographic identity for the client device to the client; and
    if the DMC is determined to be valid, send the cryptographic identity for the client device to the client device protected using the DMC and at a later time, if the DMC key size is considered to be still sufficiently secure, the validity of each DMC is extended by issuing a new DMC sub-CA certificate with a same public key as the sub-CA certificate; and
    determine at a later time whether the cryptographic identity of the client device is configured to be used based on the DMC public key size;
    wherein the processor is configured to receive the cryptographic identity for the client device and the CAS client protected using the DMC from the CAS computer in response to the CAS computer determining the DMC is valid.

10. The client device of claim 9, wherein the processor is configured to store a new or modified DMC sub-CA certificate with extended lifetime.

11. The client device of claim 10, wherein the new or modified DMC sub-CA certificate is received from a certificate authority.

12. The client device of claim 10, wherein the new or modified DMC sub-CA certificate is received from an intermediate server.

13. The client device of claim 9, wherein the processor is configured to process a global message with the new DMC sub-CA certificate.

14. A method for operating a downloadable conditional access system (DCAS) computer, the method comprising:
    by the DCAS computer:
    receiving a download manager certificate (DMC) of a client device;
    determining, using the DMC, security information including a DMC key size and an expiration time of a DMC subordinate certificate authority (sub-CA) certificate, for the client device, from a data storage, wherein the DMC key size is a key size of a DMC public key saved in the data storage;

determining whether the DMC is valid based on the expiration time of the DMC sub-CA certificate and on the DMC key size;

if the DMC is determined to be invalid, not providing a cryptographic identity for the client device and a CAS client to the client device; and if the DMC is determined to be valid, sending the cryptographic identity for the client device and a CAS client to the client device protected using the DMC and at a later time, if the DMC key size is considered to be still sufficiently secure, the validity of each DMC is extended by issuing a new DMC sub-CA certificate having extended lifetime with a same public key as the DMC sub-CA certificate; and determine at a later time whether the cryptographic identity of the client device is configured to be used based on the DMC public key size.

15. The method of claim 14, further comprising:
sending the new DMC sub-CA certificate with extended lifetime to the client device directly from a certificate authority.

16. The method of claim 14 further comprising:
broadcasting or multicasting the new DMC sub-CA certificate with extended lifetime to a plurality of client devices including the client device.

17. The method of claim 14, further comprising:
sending the new DMC sub-CA certificate to an intermediate server which distributes the new DMC sub-CA certificate to the client device.

18. The method of claim 14, wherein the DMC key size is a key size of a DMC public key saved in the data storage and the method comprises:
determining at a later time whether the cryptographic identity of the client device is configured to be used based on the DMC public key size.

* * * * *